United States Patent
Ishizuka

[15] 3,686,672
[45] Aug. 22, 1972

[54] RADIO CONTROL SYSTEM FOR CAMERA

[72] Inventor: Shigeru Ishizuka, Yokohama-shi, Japan

[73] Assignee: Yokosho Company Ltd., Yokohama-shi, Japan

[22] Filed: Dec. 12, 1969

[21] Appl. No.: 884,457

[30] Foreign Application Priority Data

Dec. 19, 1968 Japan ..................... 43/92637

[52] U.S. Cl. .................................. 343/225, 95/53 E
[51] Int. Cl. ................................................ H04b 7/00
[58] Field of Search ....... 343/225; 340/221; 317/146; 320/1; 95/11.5 A, 53 E, 53 EA, 53 EB

[56] References Cited

UNITED STATES PATENTS

| | | | |
|---|---|---|---|
| 3,511,157 | 5/1970 | Eloranta | ..................... 95/53 E |
| 3,391,623 | 7/1968 | Tabankin | ............ 340/221 UX |
| 3,466,993 | 9/1969 | Fahlenberg et al. | ..................... 95/53 EA |
| 3,012,181 | 12/1961 | Shultz | ..................... 320/1 X |
| 3,448,671 | 6/1969 | Rentschler et al. | ............. 95/53 |

Primary Examiner—Thomas B. Habecker
Assistant Examiner—William M. Wannisky
Attorney—Kane, Dalsimer, Kane, Sullivan and Kurucz

[57] ABSTRACT

The inventive radio system for controlling the operation of shutter of a camera comprises a transmitter for transmitting a signal of a radio frequency, a receiver for receiving said signal from said transmitter and an actuator circuit connected to an electro-magnetic plunger which in turn is mechanical coupled to a release member of the shutter assembly. The actuator circuit comprises an oscillator circuitry and a charging circuitry which are electrically connected to each other through a transformer so that electrical energy is charged in the charging circuit to a predetermined level. The charging circuitry has a switching element at the output side thereof connected to the electro-magnetic plunger, which element is usually open and closed, only when there appears a signal at the output of said receiver, to thereby discharge the charged energy through said electrical plunger. The latter then actuates the release member of the shutter assembly. As an additional inventive feature, the actuator circuit may comprise means for supplying a constant current to the electro-magnetic plunger after the latter has been actuated as above mentioned. This additional means comprises a diode connected to a power source of the oscillator circuitry and to the magnetic winding of the plunger by way of said switching element.

1 Claim, 4 Drawing Figures

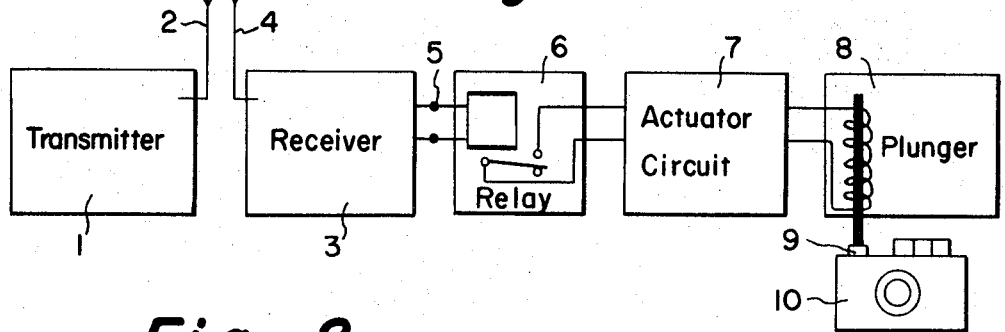
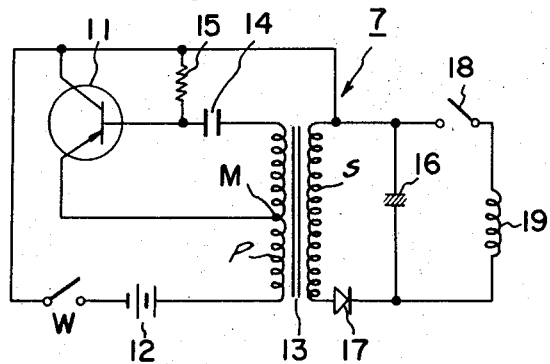
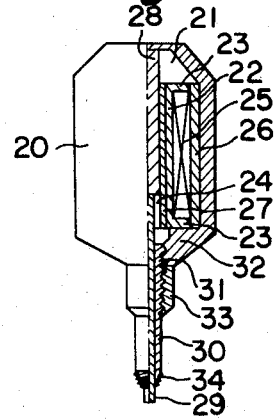
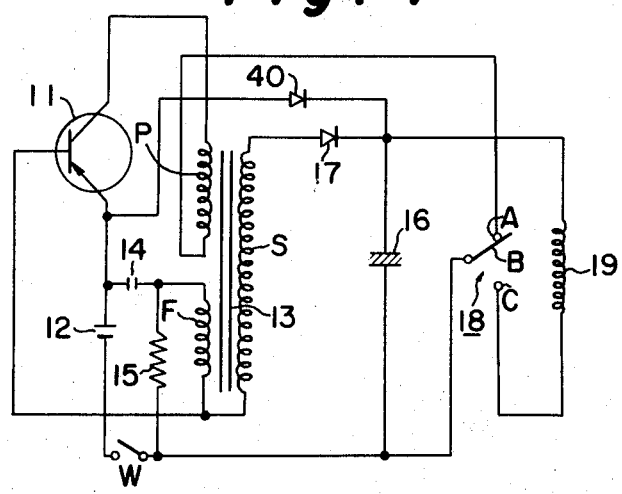
INVENTOR
SHIGERU ISHIZUKA
ATTORNEYS

RADIO CONTROL SYSTEM FOR CAMERA

BACKGROUND OF THE INVENTION

The present invention relates generally to a shutter operation control system for a photographic camera, and in more particularly to a radio control system for controlling the operation or actuation of a shutter mechanism of a photographic camera from a remote place.

It is intended that the term "photographic camera" or "camera" as herein used shall encompass both the still picture camera and the motion picture camera.

In the art of the still camera, it is known to employ a built-in or separate self-timer device to effect the automatic photographing. Furthermore, in the field of the motion picture camera, it is also known to electrically control the release device of the camera from a remote place by way of an electrical conductor or cable which is connected between the release device of the camera and a control switch carried by the user. In the former case, the time at which the operation of the shutter is to be triggered is under the control of the present timer device. In other words, the exposure chance can not be determined by the user at his will. In the latter case, the distance or range of the place at which the user can control the operation of camera is limited by the length of the conductor or cable.

Accordingly, an important object of the present invention is to provide a system for controlling the operation of a shutter of a camera which allows the user to take a photograph at any time from a desired place without being limited relative to the time and the distance which lies between the camera and the user.

Another object of the present invention is to provide a portable type of a radio control system for controlling the shutter operation of a camera.

Still another object of the present invention is to provide a radio control system of the above kind which is inexpensive in cost, simple in construction and reliable in the operation.

SUMMARY OF THE INVENTION

These objects of this invention are attained by providing a radio control system for a shutter operation of a camera which comprises a transmitter for transmitting a radio frequency signal, a receiver for responding to the signal from the transmitter to produce an output signal and means for responding said output signal from the receiver to actuate a release member for initiating the exposure process by opening shutter diaphragms or sectors. Preferably, said means are constituted by an actuator circuit and an electro-magnetic plunger device. The actuator circuit comprises an oscillator-transformer circuitry and a charging circuitry. The oscillator circuitry is adapted to begin self-oscillation by connecting a direct current power source of a low voltage to the oscillator circuit. The resulted a.c. (alternating current) voltage is transformed into a high voltage by a transformer which constitutes a part of said oscillator circuit. This high a.c. voltage is, after having been rectified, charged into a charging condenser which is connected to said electro-magnetic plunger device by way of a switch. The latter is normally open and the operation thereof is under the control of the output signal from the receiver. For example, this switch may be contacts of a low inertia relay of reed or electro-magnet type. The electro-magnetic plunger device comprises a movable core which is slidably disposed within a cylindrical magnet coil. This coil is connected to the charging condenser through the normally open switch. After the condenser has been charged to a predetermined high potential, said switch is closed in response to the output from the receiver which in turn is under the command of the transmitter. Then the condenser is discharged through the magnet coil of the plunger device, as a result of which the movable core is displaced. Since the core is mechanically coupled to a release member of a camera, the exposure process is thus introduced by the displacement of the movable core.

It is often required to maintain the shutter of a still camera in the open state for a relatively long period more than 1 second as in the case of the photographing at a dark area. Such photographing is called "photographing with bulb exposure" or "bulb (B)-photographing." Furthermore, in case of the motion picture camera, the release knob must be held in the actuated position for a period during which the photographing is carried out.

In order to meet such requirement as above mentioned, the electro-magnetic plunger device of this invention has to be maintained in the energized state for the desired period. To this end, according to the present invention, an additional means for continuously supplying a constant current to the magnet coil of the plunger device after the charging condenser has been discharged is provided. In this connection, it is to be noted that the electro-magnetic force for maintaining the release member of the camera in the actuated position is considerably less than the electro-magnetic force for initially actuating the release member. In other words, once the release member is actuated, namely the shutter diaphragm is opened, a relatively little current supply may be sufficient to keep the release member in the actuated state. For this purpose, it is proposed according to the present invention, that the magnet coil of the plunger device is connected to the power source of the oscillator circuit by way of a diode in addition to being connected to the charging condenser.

BRIEF DESCRIPTION OF DRAWINGS

These and other objects, novel features and advantages of this invention will become apparent more concretely from the following description of preferable embodiments of this invention which are shown by way of examples in the annexed drawings, in which FIG. 1 is a block diagram of a radio control system for the shutter operation of a camera, FIG. 2 is a circuit diagram of an embodiment of the actuator circuit employed in the system according to this invention, FIG. 3 is a partially sectioned, elevational side view of an electro-magnetic plunger device employed in the system according to the present invention, and FIG. 4 is a circuit diagram showing another embodiment of the actuator circuit according to this invention.

DESCRIPTION OF THE PREFERRED EMBODIMENTS:

Now, referring to FIG. 1 which shows in a block diagram a radio control system for controlling the operation of the shutter mechanism of a photographic camera according to the present invention, reference numeral 1 indicates a transmitter which is adapted to emit a suitable signal of a radio frequency from antenna 2 thereof when a photograph is to be taken. This signal is received by a receiver 3 by means of antenna 4, which receiver 3 in turn produces an output signal at the output terminals 5 thereof. For such transmitter and receiver 1 and 3, any types of transmitter and receiver may be employed, so far as the transmitter can emit a signal having a frequency within a radio frequency range and a suitable wave form, and the receiver can produce, in response to the radio frequency signal from the transmitter, an output signal having a suitable voltage level or amplitude at the output terminal thereof. For example, the transmitter and the receiver which are commonly employed in a wireless remote control system for controlling the navigation of a model plane or ship may be used for this purpose. Furthermore, a tranceiver can also be used to this end. In any case, it will be preferable that the transmitter is of a portable type, so that the user or photographer can easily carry it about. Since these radio transmitter and receiver are well-known in the art, further detailed description thereof will be unnecessary.

Connected to the output terminals 5 of the receiver 3 is electro-magnetic switch or relay 6 which comprises a solenoid and switch contacts. When there appears the output signal at the terminals 5 of the receiver 3, the coil or solenoid of the relay 6 is energized and the contacts thereof are then switched from the rest position to the operative or trigger position. For such a relay, any types of electro-magnetic relay can be employed. However, it is preferable that the relay 6 has inertia as little as possible so that it can respond to the output signal of a relatively low voltage level appearing at the output terminals 5 of the receiver. For example, a reed relay can advantageously be used to this end. In such case, the receiver may have a small output and can be designed so as not to be bulky.

Reference numeral 7 indicates an actuator circuit which responds to the trigger signal produced by the relay 6 to energize an electro-magnetic plunger device 8 which is connected to the output of the circuit 7. As will be hereinafter described in more detail, the actuator circuit comprises an oscillator-transformer circuitry and a charging circuitry. The switch contacts of the relay 6 are disposed in the charging circuitry. When the coil of the relay 6 is energized, the contacts of the relay are switched to the position to close the charging circuit, as a result of which a charging condenser of the charging circuit which has been previously charged is discharged through the winding of the electro-magnetic plunger 8. The plunger 8 comprises a movable iron core as hereinafter described in more detail, which core is then displaced in a direction to actuate or push down a release member 9 of a photographic camera 10, to which the movable iron core of the electro-magnetic plunger 8 is mechanically connected.

Next referring to FIG. 2 which shows a preferable embodiment of the actuator circuit 7 as above mentioned, reference numeral 11 indicates a transistor which constitutes a part of the oscillator-transformer circuitry of the actuator circuit. The transistor 11 has a collector which is electrically connected to negative pole of a power source 12 by way of a switch W. The oscillator-transformer circuitry further comprises a transformer having a primary winding P provided with a center tap point M which is directly connected to the emitter electrode of the transistor 11. One extremity or terminal of the primary winding P of the transformer 13 is directly connected to the positive or plus pole of the power source or battery 12, while the other extremity of the primary winding P of the transformer 13 is connected to the base of the transistor 11 by way of a condenser 14. Furthermore, an ohmic resistor 15 is connected between the collector and the base of the transistor 11. As will be apparent for those skilled in the art, the transistor, primary winding P of the transformer 13 and the elements 14, 15 compose a self-oscillator circuit having oscillation frequency determined by circuit parameters such as inductance of the primary winding of the transformer 13, capacitance of the condenser 14 and the resistance valve of the resistor 15.

One extremity of the secondary winding S of the transformer 13 is directly connected to one pole of a condenser 16, while the other extremity of the secondary winding S is connected to the other pole of the condenser 16 by way of a rectifier circuit or diode 17. Connected in parallel to the condenser 16 by way of a normally opened switch 18 is an inductive load 19 which is constituted by the energizing coil of the electro-magnetic plunger assembly 8 as hereinafter mentioned. It will be apparent that the secondary winding S of the transformer 13, the rectifier 17 and the condenser 16 constitute the charging circuitry of the actuator circuit 7. In this connection, it can of course be understood that the switch 17 corresponds to the contacts which are under influence of the coil of the relay 6 shown in FIG. 1.

FIG. 3 shows in a partially sectioned side elevational view an embodiment of the electro-magnetic plunger device 8 (refer to FIG. 1) which is adapted to be electromagnetically operated by the actuator circuit 7. The plunger device 8 comprises a cylindrical housing 20 preferably of a non-magnetic material having a cylindrical chamber 21 formed therein, within which a coil spool 22 having a pair of end collars or flanges 23 is fixedly fitted. The spool 22 has a central bore 24. A sleeve 27 of a non-magnetic material is fixedly disposed within the bore 24. A coil 25 is wound on the spool 22 between the collars 23 in such a manner that a direct current electro-magnet having opposite poles at the open ends of the spool 22 is provided. The coil spool 22 with flanges 23 as well as a cylindrical wall 26 which is disposed across the flanges 23 in a bridge-like manner are made of a magnetic material so that the closed magnetic flax path is provided therethrough. Freely slidably disposed within the inner non-magnetic sleeve 27 is a movable core 28 of a ferro-magnetic material 28 which has a lower end secured to a push rod 29. The rod 29 is guided through a sleeve 30 having a threaded upper end portion 31, by means of which the sleeve 30 is screwed into the bottom portion 32 of the housing 20 having a correspondingly threaded portion. Reference numeral 33 indicates an adjusting or setting nut which is also screwed onto the threaded portion 31 of the guide sleeve 30 in the abutting relation to the bottom surface of the housing 20. It will be readily understood that the length of the guide sleeve 30 which extends outwardly of the housing 20 or the length of the push rod 29 which projects outwardly from the sleeve 30 can be easily adjusted merely by changing the position of the adjusting nat 33 relative to the guide sleeve 30. The sleeve 30 has a threaded conical lower end portion 34 so as to be mechanically coupled to a release knob of a camera which has usually a correspondingly threaded receptacle opening. Furthermore, it will be understood that the coil 25 of the plunger device of FIG. 3 is connected to the actuator circuit in a manner indicated in FIG. 2 by the inductive load 19.

In operation of the radio control system as above mentioned, the electro-magnetic plunger device 8 is mounted on the release knob 9 of a photographic camera 10 (refer to FIG. 1) by means of the thread 34 formed in the conical lower end portion of the guide sleeve 30. Then, the movable core 28 as well as the push rod 29 connected thereto take the position such as shown in FIG. 3 under the resilient counter force exerted by the shutter mechanism of the camera. Namely, the movable core 28 is urged upwardly as viewed in FIG. 3 and partially projects outwardly from the interior of the sleeve 27.

Next, the oscillator-transformer circuitry of the actuator circuit 7 (FIG. 2) is closed or connected to the power source 12 by means of a suitable switch W. Then, the oscillator-transformer circuitry begins the self-oscillation at the frequency determined by circuit parameters such as the inductance of the primary winding of the transformer 13, capacitance 14 and resistance 15, as a result of which a high alternating current voltage is induced across the secondary winding of the transformer 13. This high a.c. voltage is charged into the condenser 16 after having been rectified by the rectifier 17. At this time, the switch 18 is still held open.

Under such conditions as above mentioned, if the transmitter 1 (FIG. 1) emits a command signal to actuate the release knob 9 of the camera 10, the receiver 3 will produce an output signal in response to said command signal from the transmitter 1. The relay 6 which is connected to the output of the receiver 3 is then energized to close the switch contacts, i.e. the switch 18 (FIG. 2). The condenser 16 is then discharged through the inductance 19, i.e. the coil 25 (FIGS. 2 and 3). When the coil 25 of the electro-magnetic plunger device 8 is thus powerfully energized, the movable core 23 is magnetically attracted downwardly as viewed in FIG. 3 or into the central bore 24 to push down the release member or knob 9 of the camera to thereby effect the photographing.

As is well known, it requires relatively great force to press down the release knob or to effect the operation of the shutter of a photographic camera. For example, force of 0.1 to 1.2 kg will be required. The electrical energy for energizing the electro-magnetic device 8 to overcome such great force must necessarily be large. Accordingly, if the output of the receiver 3 were directly used to energize the electro-magnetic plunger 8, then the receiver would have to incorporate therein a many amplifier stages. This would result in an expensive and bulky receiver. In order to evade such disadvantage, it is contemplated according to the present invention to use the actuator circuit which is separated from the receiver and is adapted to energize the electro-magnetic plunger 8 by its own charged electrical energy in response to the output signal from the receiver 3. According to such arrangement of this invention, the output of the receiver 3 may be at a relatively low voltage level, so far as the switching element such as relay 6 can be actuated to trigger the operation of the actuator circuit 7, which is capable of producing a high output voltage for energizing the plunger device 8 if the transformers 13 having a suitable transformation ratio is employed. For example, with a battery of 3 v as the power source 12 in the oscillation circuitry, an output voltage in the order of 300 v can be obtained from the charging circuitry which is connected to the coil 25 of the plunger device 8.

FIG. 4 shows another embodiment of the actuator circuit according to the present invention. This actuator circuit is adapted to continuously energize the electro-magnetic plunger 8 to thereby maintain the release knob of a camera in a pushed or actuated position for a desired period, namely maintain the shutter diaphragms or sectors in the open position for a desired long exposure time. This actuator circuit is therefore suitable for the photographing with B-exposure and for a motion picture camera.

In the actuator circuit of FIG. 4, a transformer 13 having primary, secondary and feedback windings P, S and F respectively is provided. The one extremity of the primary winding P is connected to the collector of a transistor 11 which corresponds to the transistor 11 of the actuator circuit shown in FIG. 2. The other extremity of the primary winding P is connected to a stationary contact A of a switch 18. The one end of the secondary winding S of the transformer 13 is connected to one terminal of a charging condenser 16 and an inductive load 19 or the plunger coil 25 by way of a rectifier 17, while the other end of the secondary winding S is connected to the base of the transistor 11 in common with one end of the feedback winding F. The other end of the winding F is connected to the emitter of the transistor 11 through a condenser 14. The other terminal of the charging condenser 16 is directly connected to a movable contact B of the switch 18 and to the negative pole of a d.c. power source 12 by way of a switch W. The positive pole of the source 12 in turn is connected to the emitter of the transistor 11. A resistor 15 is inserted between the junction of the condenser 14 and the feedback winding F and the condenser 16. Furthermore, another diode 40 is connected between the positive pole of the d.c. power source 12 and the load 19 in a forward biased direction as shown in FIG. 4. The switch 18 has another stationary contact C which is connected to the other terminal of the load 19. It will be appreciated that this switch 18 is constituted by relay contacts of the relay 6, and the movable contact B is closed to the stationary contact A, so far as the coil of the relay 6 is not energized by the output from the receiver 3. Refer to FIG. 1.

In operation, when the switch W is closed, the self-oscillation takes place in the oscillator circuitry as hereinbefore mentioned in connection with the circuit of FIG. 2 and the charging condenser 16 is charged to a high potential. The diode 40 then serves to prevent current from frowing backwardly from the condenser 16 to the d.c. power source 12. Under such condition, when the relay 6 is energized by the output voltage from the receiver 3 in response to the radio frequency command signal from the transmitter 1, the movable contact B of the switch 18 is switched to the stationary contact C, and the load 19 or the coil 25 of the plunger device 8 is powerfully energized by the discharging current from the condenser 16. This causes the core 23 to be displaced into the central bore 24 of the spool 22 to thereby push the shutter release knob 9 of the camera 10, which results in the opening of shutter diaphragms or sectors. When the condenser 16 has discharged substantially to the potential level of the d.c. power source 12, the energization of the load 19 is replaced by the source 12 through the rectifier 40. In this connection, it is to be noted that, although it require a great force to push the release knob to initiate the exposure process, a relatively little force is sufficient to maintain the knob in the pushed position. In other words, once the core 23 is magnetically attracted into the bore 24 by a large current discharged from the condenser 18 to the coil 25, the power supply only from the source 12 is sufficient to maintain the core 23 in such attracted position. Accordingly, the shutter sectors will remain in the open position, if the camera is set to bulb or B-exposure. When the movable contact B is disengaged from the contact C, the energization of the coil 25 of the plunger device 8 at the lower voltage is removed, which results in the closing of the shutter. The relay 6 for controlling the switching of the movable contact B as well as the transmitter 1 and the receiver 3 can be so designed that the energization of the relay 6 with the movable contact B closed onto the contact C is maintained for a desired period by a continuous output from the receiver 3 in response to the continuous signal from the transmitter 1. Alternatively, a self-holding circuit may be provided for the relay 6 in such a manner that, once the relay 6 is energized by a first signal from the transmitter 1 which may be of a relatively short duration, the relay 6 is maintained in this state by said holding circuit. The de-energization of the relay or reopening of the holding circuit may be effected by a second corresponding signal from the transmitter 1. Since such holding circuit is well known in the art, further detailed description thereof is herein omitted. As hereinbefore mentioned, the actuator circuit of FIG. 4 is well suited also for a motion picture camera which usually requires the release knob to be in the actuated or pushed position for the period during which the photographing is effected.

While preferred embodiments of the present invention have been disclosed and described in detail, it should be appreciated that many modifications in details of the construction will be possible for those skilled in the art without departing from the scope and the spirit of this invention.

For example, although relays are employed in the illustrated embodiments as the switching element which serves to trigger the actuator circuit in response to the received signal from the command transmitter, it will be appreciated that other switching element such as switching transistor, thyristor, etc. can be used in place of the relay. For example, a thyristor may be inserted in place of the switch 18 in the actuator circuit with its gate electrode connected to the output of the receiver 3.

Furthermore, various oscillator circuits other than those shown in the drawings can be employed for the same purpose.

The receiver circuit, the actuator circuit and the electro-magnetic plunger can be assembled in one unit.

I claim:

1. A radio control system for remotely and wirelessly controlling the shutter operation of a photographic camera, comprising:
   a radio frequency transmitter for producing and emitting a photographing signal of a radio frequency,
   a radio frequency receiver for receiving said photographing signal and producing a voltage at output thereof,
   a relay having an energizing coil connected to said output of said receiver and a pair of alternatively switchable contacts, one of which is closed by a movable contact actuated by an armature controlled by said relay coil when said output voltage of said receiver is applied to said coil, while the other contact is normally closed, said movable contact being connected to a direct current battery,
   a release actuator having a movable magnetic element adapted to be operationally coupled to a release member of the shutter of a camera and winding enclosing said movable element to electro-magnetically move said element to thereby actuate said release member upon being energized, said winding having first and second terminals, said first terminal being connected to said one contact of said relay,
   a charging condenser having first pole connected to said second terminal of said actuator winding and second pole connected to said direct current battery by way of an oscillating switch,
   a step-up transformer having primary, secondary and feedback windings,
   a first rectifier connected between one end of said secondary winding and said first pole of said charging condenser,
   a second rectifier forwardly connected between said first pole of said charging condenser and said battery, and
   a transistor having collector, base and emitter, said collector being connected to one end of said primary winding of said step-up transformer, the other end of which is connected to said normally closed contact of said relay, said emitter being connected to said battery and coupled to one end of said feedback winding, and said base being connected to both of other ends of said secondary and feed back windings of said step-up transformer.

* * * * *